March 5, 1957
S. C. KILLIAN ET AL
2,784,012
PACKED SLEEVE JOINT FOR BUSES
Filed May 7, 1952
2 Sheets-Sheet 1
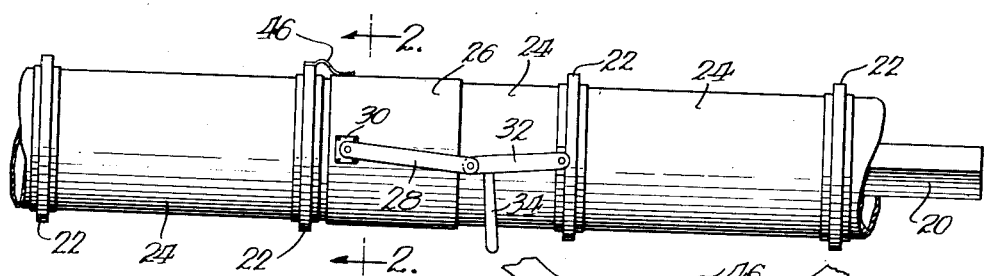
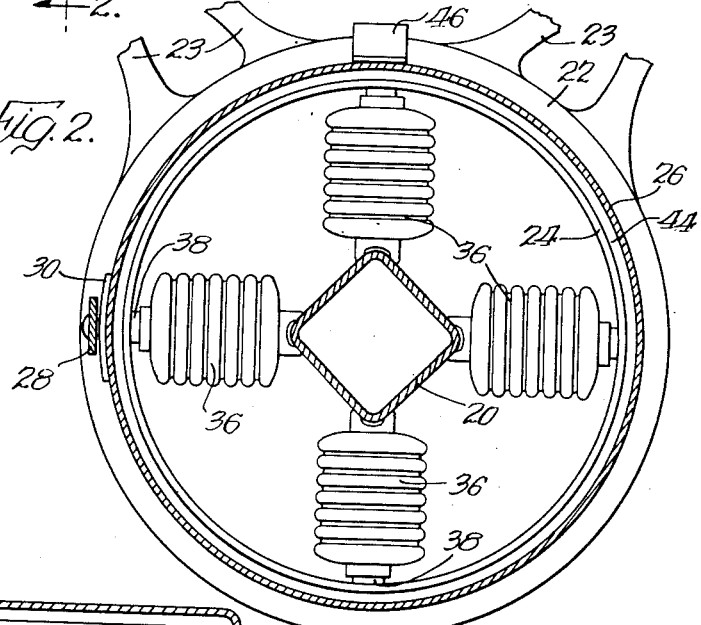
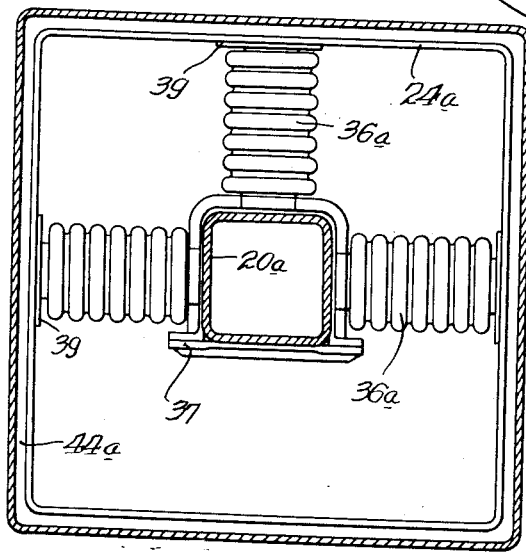
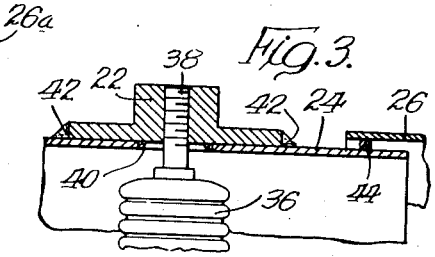
INVENTORS.
Stanley C. Killian
Willard O. Edison
BY Brown, Jackson,
Boettcher & Dienner
Attys.

March 5, 1957
S. C. KILLIAN ET AL
2,784,012
PACKED SLEEVE JOINT FOR BUSES
Filed May 7, 1952
2 Sheets-Sheet 2
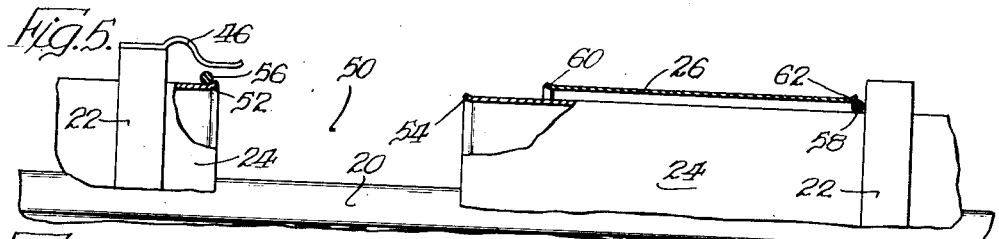
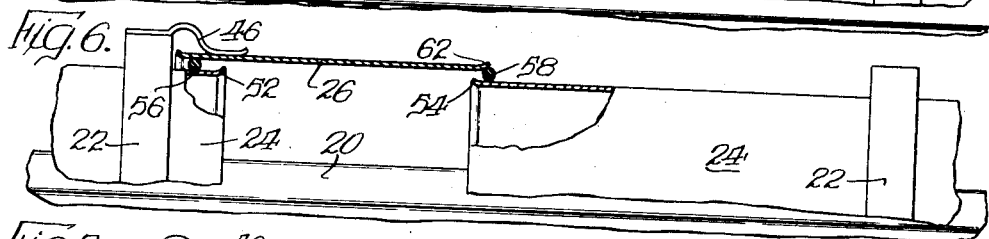
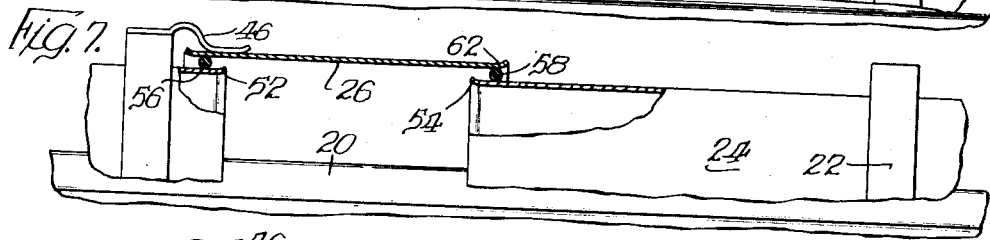
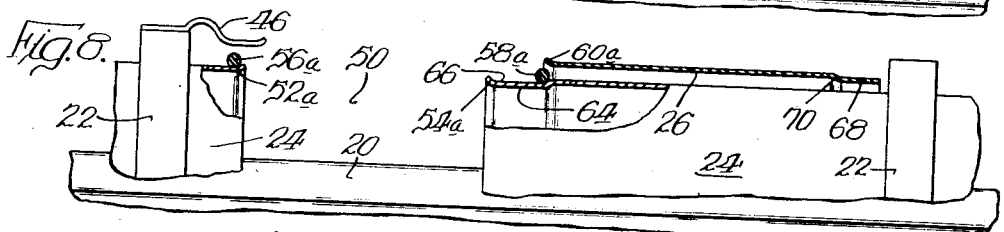
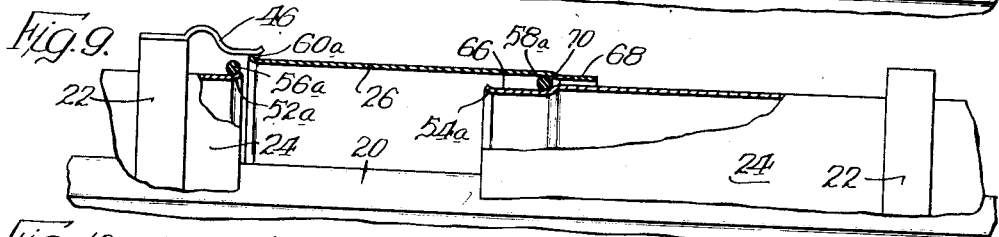
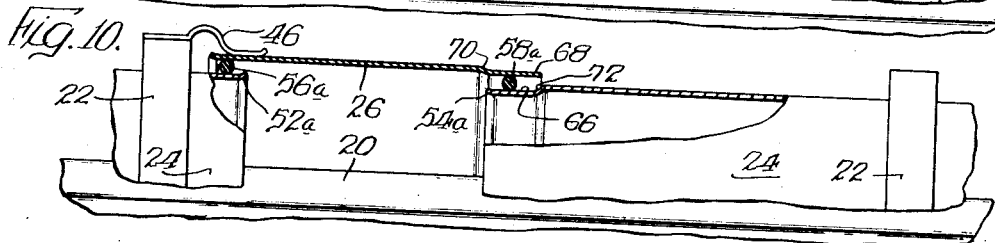
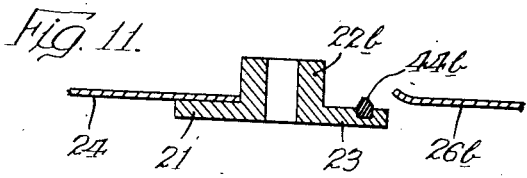
INVENTORS.
Stanley C. Killian
BY Willard O. Edison
Brown, Jackson,
Boettcher & Dienner
Attys:

United States Patent Office 2,784,012
Patented Mar. 5, 1957

2,784,012

PACKED SLEEVE JOINT FOR BUSES

Stanley C. Killian and Willard O. Edison, Chicago, Ill., assignors, by mesne assignments, to H. K. Porter Company, Inc. of Pittsburgh, Chicago, Ill., a corporation of Pennsylvania Application May 7, 1952, Serial No. 286,645

1 Claim. (Cl. 285—369)

The present invention relates to enclosures for bus bars and, particularly, to bus bar enclosures providing ready access to the bar for inspecting the same.

Bus bars for electrical power transmission are customarily enclosed in suitable housing means to protect the bars from the accumulation of foreign particles, to prevent the entry of moisture, to shield the bars from the elements and to protect personnel from accidentally contacting the bars. Heretofore, the assembly of the bus bar covers or enclosures has been complex and inconvenient since two factors must be met. The first of these factors is that the covers must be sealed about the busses and the second is that the covers must be removable to provide for inspection and cleaning of the busses.

In view of these factors, conventional bus bar covers have been made in sections adapted to be detachably secured together and have included cumbersome seals and clamps to effect a detachable connection or assembly. For example, one conventional cylindrical bus cover, at each section of cover, comprises a pair of bus rings adapted to provide an insulated support for the bus bar and a mounting for the complete bus, a pair of semi-cylindrical cover sections adapted to be mated to provide a cylindrical cover for the bar, a pair of sectional gaskets, and suitable clamping means for each end of the cover sections. Since the cover has to seal the bus against entry of dust and moisture, the gaskets are quite voluminous and require a great number of fasteners or bolts. In addition, the joining of the gasket is very difficult to accomplish. Busses of the type described and other conventional busses present a major problem in inspection since considerable time and energy is involved in removing the various bolts, gaskets and cover sections to view the bus.

It is an object of the present invention to overcome the disadvantages of conventional busses by providing improved closure means therefor.

In particular, it is an object of the present invention to provide improved bus enclosures adapted to be fixedly mounted to the bus rings and including a relatively movable section or portion to provide ready access to the interior of the bus.

According to the present invention, we provide bus enclosures comprising stationary cover sections provided with openings or interruptions at spaced points, movable cover sections slidably or telescopically mounted on the stationary cover sections to close the openings or interruptions therein, and gasket means between the movable and stationary cover sections adapted to accommodate relative movement of the sections and to seal the sections when the movable sections close the openings or interruptions in the stationary sections.

The present invention, by providing the movable cover sections, accommodates the quick and convenient inspection of the bus without the necessity for disassembly of any cover parts thus greatly speeding up and rendering much more efficient bus inspection.

In the preferred embodiment, the bus enclosures of the present invention comprise peripherally continuous cover sections and gaskets and the gaskets are adapted to roll along the cover section upon actuation of the movable section so that actuation is readily effected. However, various modifications may be made as will become apparent hereinafter.

Other objects and advantages of the present invention will become apparent in the following detailed description of preferred embodiments of the invention, wherein reference is made to the accompanying drawings, in which:

Figure 1 is a side elevation of a bus and enclosure therefor, the closure being shown as circular in cross-section, but which may be of any desired cross-sectional configuration;

Figure 2 is cross-sectional view of a bus and a cylindrical cover therefor, the view being taken substantially on line 2—2 of Figure 1;

Figure 3 is a partial longitudinal section of the bus shown in Figure 2, the view being taken at a bus ring and showing a movable cover section sealed to a stationary cover section;

Figure 4 is a view similar to Figure 2 of a bus having a square cover;

Figures 5 to 7 are partial side views, partly in section and partly in elevation, of a bus enclosure according to the present invention, showing the movable section in open, partially closed and closed positions, respectively;

Figures 8 to 10 are partial side views similar to Figures 5 to 7, respectively, of a second embodiment of the bus enclosure of the present invention; and Figure 11 is a partial longitudinal sectional view of a further embodiment of the present invention.

Referring now to Figure 1 of the drawings, we have shown a bus comprising a continuous bus bar 20 supported by means of insulators 36 at spaced points by means of a plurality of bus rings 22 which are each adapted to be secured by their flanges 23 (see Figure 2) to suitable supporting means (not shown). The bus rings 22 also provide a support for a bus cover comprising a plurality of stationary sections 24 and a movable section 26. As will be apparent, the movable section 26 is telescopically mounted for movement on one of the stationary sections 24 of the cover. If desired, a movable section 26 may be provided between each pair of bus rings, between every other pair of bus rings, or whatever arrangement may be required or desired for particular installations. As will become more fully apparent hereinafter, the movable section 26 is sealed with respect to the stationary cover sections 24 by means of a pair of gaskets disposed adjacent the opposite ends thereof. The gaskets will be described at greater length hereinafter.

To effect telescopic movement of the section 26 along the stationary cover sections 24, the movable section 26 may be provided with suitable actuating means in the form of a linkage assembly. As shown in Figure 1, the movable cover 26 is provided with a toggle linkage including a link 28 pivoted to the movable section 26 by means of a bracket 30, a second link 32 pivoted at its opposite ends to the link 28 and to one of the bus rings 22, respectively, and a handle 34 secured to or formed integrally with the link 32. Actuation of the movable cover 26 by means of the handle 34 will be obvious. The linkage preferably is insulatingly mounted at least adjacent one end so as to provide no conducting path from the movable cover 26 to the fixed cover 24, or the ring 22 at the right. If preferred, a portable linkage, or actuator, may be employed and shifted from one movable cover 26 to another. For example, the sliding section can be moved very easily by clamping straps about the sliding section. The straps can have holes to take bars which fasten to toggle levers with the toggle levers being fastened to a base ring.

Referring now to Figures 2 and 3, the bus bar 20 is shown as being square in cross-section and supported at each corner thereof by means of an insulator 36. Each insulator 36 is adjustably confined between the bus ring 22 and the bus bar 20 by means of an adjusting screw 38 threaded into a tapped bore provided in the bus ring 22. In the preferred structure, the cover sections 24 and 26 are peripherally continuous cylindrical sections and the stationary sections 24 are passed through the interior of the bus rings 22 so as to eliminate any possibility of breathing or leakage due to faulty ring castings. To accommodate passage of the adjusting screw 38, the stationary cover sections 24 are provided with holes therein at the ring portion thereof. To prevent leakage, the cover sections 24 are preferably welded about the holes provided therein, as indicated at 40, to provide a seal between the cover and the bus rings 22. At the exterior surface thereof, the cover sections 24 are preferably welded to the bus rings 22, as indicated at 42, to either side of the bus rings.

To provide a seal between the movable cover section 26 and the stationary cover sections 24, suitable gaskets 44 are provided between the cover sections 24 and 26. The gaskets 44 suitably insulate the movable cover section 26 from the stationary cover section 24, to its right, for example, and prevent circulating currents from running the length of the bus enclosure. It is preferable to ground the bus rings 22 so that the stationary covers sections 24, which are welded to the bus rings 22, are also grounded. To ground the movable cover sections 26, a suitable lamination, indicated at 46, is provided between each of the cover sections 26 and the bus ring 22 to its left. In the preferred embodiment, the laminations 46 are preferably secured to the bus rings 22 and may be detachably secured to the movable cover section 26. As shown in the drawings, however, the lamination 46 may be in the nature of a spring finger adapted frictionally to engage the cover section 26 when the same is moved into position to close the opening provided in the stationary cover sections 24. If desired, a plurality of laminations 46 may be provided for each movable cover section 26.

Referring now to Figure 4, we have shown a square bus cover adapted to employ the features of the present invention. The embodiment of the invention shown in Figure 4 is very similar to the embodiment of the invention previously described and, for this reason, parts and elements of the embodiment of the invention in Figure 4 similar to parts and elements of the embodiment of the invention shown in Figures 1 to 3 have been indicated by like reference numerals with the suffix "a." As shown in Figure 4, the bus bar 20a is square in section and is supported within the square cover by means of a plurality of insulators 36a and a square bracket 37 supported by the insulators and encompassing the bus bar 20a. In the embodiment of the invention shown in Figure 4, the bus rings 22 are omitted since the stationary cover sections 24a may be suitably secured directly to a supporting structure. The movable cover section of the bus enclosure is indicated at 26a and may be suitably provided with toggle linkage means similar to those shown in Figure 1 for actuating the same, although such means are not shown in Figure 4. The insulators 36a each preferably include a flat plate 39 at the outer end thereof by means of which the insulator is secured to the stationary cover section 24a, as by riveting or welding. To seal the movable cover section 26a with respect to the stationary cover sections 24a, a suitable gasket 44a is provided between the two sections. As pointed out hereinbefore, to eliminate the possibility of circulating currents running the length of bus, the movable cover section 26a may be suitably grounded by means of a lamination or the like, not shown.

While we have only shown herein circular and square type bus covers, it will be appreciated as the description proceeds that the present invention is not limited in application to the two types of bus covers shown, but may be applied to covers having various configurations.

Referring now to Figures 5, 6, and 7, we have shown, somewhat schematically, one embodiment of the movable cover section and sealing means therefor according to the present invention. As shown in Figure 5, the stationary cover portions 24 are provided in separate sections with the section shown at the left of the figure terminating adjacent one of the bus rings and the section shown at the right of the figure terminating in spaced relation to the first stationary section so that an opening or interruption 50 is provided in the cover between the stationary sections thereof. It will be appreciated that while we prefer to provide a complete interruption between the stationary cover sections 24, the stationary cover may be continuous and provided at spaced points therein with openings in the nature of windows or the like to facilitate the observation and inspection of the bus bar within the cover. As pointed out, it is preferred that a complete interruption be provided between the stationary cover sections so that the cover provided by the present invention may be made up and assembled in sections for convenience in handling the same.

At the free ends thereof defining the interruption between the stationary cover sections, each cover section is preferably turned outwardly to a slight extent so as to provide an outwardly extending lip or the like, as indicated at 52 and 54, respectively. As will be appreciated, the lips 52 and 54 may be continuous or interrupted, as desired. Each of the stationary cover sections 24 is adapted for the reception of and carries a gasket, indicated at 56 and 58, respectively. The gasket 56 is adapted to be received on the portion of the stationary cover section shown at the left of the figures so as to be confined between the bus ring 22 and the lip 52 provided on the stationary cover section 24. The gasket 58 is adapted to be received and carried by the stationary cover section 24 shown at the right in the figures and is adapted to be confined on the cover section between the lip 54 and the bus ring 22 supporting that cover section.

The gaskets 56 and 58 preferably comprise conventional O-ring seals formed of a resilient sealing material, such as neoprene, rubber, or the like. By providing O-ring seals between the stationary and movable cover sections, the present invention provides for rolling movement of the seals along the cover sections so as to appreciably reduce the frictional engagement between the seals and the cover sections and thus to substantially reduce the amount of energy required to effect the seal and to effect movement of the movable cover section. While the O-ring seals have application to bus bar covers of substantitally all configurations, it will be appreciated that the merits thereof are more greatly enjoyed with bus bars having a circular cross-section since the rolling action described hereinbefore is most readily accomplished on a cylindrical surface.

At the opposite ends thereof, the movable cover section 26 is provided with outwardly turned portions to provide lips 60 and 62, respectively, under which the seals or gaskets 56 and 58 may be rolled. Referring to Figure 5, the movable cover section 26 is shown in its open position wherein the bus bar is exposed for inspection and cleaning through the interruption 50 provided between the stationary cover sections 24. To close the interruption or opening between the stationary cover sections, the movable cover section 26 is moved to the left, for example, by the toggle arrangements described above in connection with Figure 1, to cause the lip 60 provided on the left hand end of the movable cover section 26 to engage the O-ring seal 56. Upon engagement of the lip 60 with the seal 56, the O-ring 56 is rolled along the surface of the stationary cover section 24 and underneath the lip 60 so as to be confined between the cover sections 26 and 24, as is shown in Figure 6. Thereafter, the gasket 58 provided on the other stationary housing section 24 may be rolled, as by hand, along the section from the position shown in Figure 5 to the position in Figure 6 wherein the same engages the lip 62 provided at the right hand end of the movable cover section 26. After the O-ring 58 has been engaged with the lip 62, the movable cover section 26 may be moved to the right to roll the O-ring 58 under the lip 62 and to confine the same between the cover sections 26 and 24, as is shown in Figure 7.

To effect the defined action of the movable cover section 26 and the O-ring seals 56 and 58, the cover section 26 is moved to the left after engagement with the O-ring 56 by a predetermined distance or extent so as to effect a predetermined rolling movement of the seal 56. After the O-ring 58 has been engaged with the opposite end of the movable cover section 26, the section 26 is returned or moved to the right by distance equal to half the hereinbefore stated predetermined distance of movement so as to confine both of the seals 56 and 58 between the cover section 26 and the cover sections 24. The seals 56 and 58, due to their frictional engagement with the cover sections and due to their resistance to rolling action along the cover sections 24, will be suitably confined between the movable cover section and the stationary cover sections in the manner described. It is preferred that the seals 56 and 58 be slightly compressed upon confinement between the cover sections so as to be disposed in intimate sealing engagement with the cover sections when the interruption or opening in the stationary cover sections is closed by the movable cover section 26. Accordingly, the seals 56 and 58 frictionally hold the cover section against accidental relative movement with respect to the stationary sections 24 and provide an efficient seal between the cover sections to prevent the entry of dirt, dust and moisture to the interior of the cover. Therefore, the bus bar enclosed by the cover will be effectively sealed from atmosphere by the enclosure of the present invention. It will also be observed that gasket 58 electrically insulates cover 26 from cover section 24 to its right. This prevents circulating currents from running the full length of the bus enclosure.

To open the enclosure to provide for inspection of the bus bar, it is merely necessary to move the movable cover section 26 to the left by one-half the said predetermined distance so as to release the cover section from the seal 58. The O-ring 58 is then rolled along the cover section 24 shown at the right of the figures toward the right hand bus ring 22. Thereafter, the movable cover section 26 may be readily returned to the right to the position shown in Figure 5 wherein the opening 50 is exposed to provide for inspection and cleaning of bus. It is obvious, of course, that embodiments of our invention will be readily comprehended by those skilled in the art, after a perusal of this specification, in which the rolling of O-ring 58 may be completely accomplished by the movement of the movable cover section 26 when appropriate pressure is applied to the toggle linkage means. In the present embodiment, however, we prefer that rolling of the said O-ring 58, other than the aforedescribed predetermined distance, be accomplished by other means, as, for instance, by hand. The above described method of operating the embodiment of the invention shown in Figures 5 to 7 is the subject of our copending divisional application, Serial No. 602,051, filed August 3, 1956.

Due to the efficient seal provided by the O-rings 56 and 58 between the cover sections 24 and 26, and due further to the effective sealing provided by passing the stationary cover sections 24 through the interior of the bus rings 22, the present invention provides a highly efficient and thoroughly sealed cover for bus bars. In addition, the bus cover can be readily opened and the bus bar inspected in a matter of a few minutes, which is a substantial improvement as compared to the tedious and time consuming operations necessary to remove the cover sections of conventional bus bar covers.

Referring now to Figures 8 to 10, we have shown a modified embodiment of the sealing arrangement of the present invention. The embodiment of the invention shown in Figures 8 to 10 is quite similar to the embodiment of the invention shown in Figures 5 to 7 and, therefore, like parts have been indicated by like reference numerals having the suffix "a." As shown, the stationary cover sections 24 are provided at the free ends thereof with lips 52a and 54a to retain the O-ring seals 56a and 58a on the respective cover sections. The movable cover section 26 is provided at the left hand edge thereof with the lip 60a adapted for engagement with the seal 56a. In the present embodiment of the invention, the O-ring 58a is received within a peripheral groove 66 provided by a stepped portion 64 in or on the stationary cover section 24 shown at the right of the figures. At the right hand end thereof, the movable cover section 26 is stepped inwardly, as at 68, to present a peripheral shoulder 70 on the interior of the movable cover section. In use and operation of the embodiment of the invention shown in Figures 8 to 10, the opening or interruption 50 provided between the stationary cover sections 24 is closed by moving the movable cover section 26 to the left until the lip 60a thereon engages the O-ring seal 56a provided on the stationary cover section 24 shown at the left of the figures. As shown in Figure 9, as the movable cover section 26 is moved to the left, the shoulder 70 provided on the movable cover section engages the O-ring seal 58a slightly in advance of the time the lip 60a engages the O-ring seal 56a. While we have shown the shoulder 70 as engaging the seal 58a slightly in advance of engagement of the seal 56a by the lip 60a, it will be appreciated, as the description proceeds, that the shoulder 70 may engage the ring 58a slightly in advance of, substantially at the same time as, or slightly after engagement of the seal 56a by the lip 60a.

As the lip 60a engages the seal 56a, the seal 56a is rolled under the lip 60a so as to be confined between the cover sections 24 and 26. At approximately the same time, the seal 58a is rolled by the shoulder 70 under the reduced portion 68 provided on the movable cover section 26 so as to confine the seal between the reduced portion 68 of the cover 26 and the peripheral groove 66 provided in the stationary cover section 24. In this position, as is shown in Figure 10, the movable cover section 26 is sealed with respect to the stationary cover sections 24 to close the opening 50 provided in the stationary sections.

To open the movable cover section 26 in the embodiment of the invention shown in Figures 8 to 10, it is merely necessary to move the cover section 26 to the right. As the cover section 26 is moved to the right, the O-ring seal 56a engages the lip 52a so as to be stopped and be freed from confinement between the two cover sections. At approximately the same time, or either before or after disengagement of the seal 56a and the cover section 26, the O-ring seal 58a engages the portion of the stationary cover section 24 defining the rearward wall 72 of the groove 66 so that the reduced portion 68 of the movable cover section 26 slides over the seal to free the same from confinement between the stationary cover section and the movable cover section. As it will be appreciated from a consideration of the figures, the major portion of the movable cover section 26 is freed of engagement of the seal 58a so that the cover may be rapidly, conveniently and easily moved to the right to the position shown in Figure 8 to reveal or expose the opening or interruption provided between the stationary cover sections 24.

The two embodiments of the invention, as shown in Figures 5 to 7 and in Figures 8 to 10, respectively, have separate advantages which will render the two particularly adapted for various installations. For example, the embodiment of the invention shown in Figures 5 to 7 involves little special formation of the cover sections and accomplishes the seal between the cover sections as a result of reciprocation of the movable telescopic section 26 of the cover. The embodiment of the invention shown in Figures 8 to 10 requires a particular formation of the opening in the stationary various cover sections, but the opening in the stationary cover section is closed and the seal accomplished merely by movement of the movable telescopic cover section in one direction. The advantages enjoyed by both embodiments of the invention are that the O-ring seals 56, 58 and 56a, 58a respectively, are adapted to roll along the cover sections so as to appreciably reduce the friction and the amount of energy required to effect the seal between the cover sections. It will be appreciated that in both embodiments the O-rings roll along level, even surfaces that are substantially parallel to each other and are substantially parallel to the axes of, for instance, the stationary sections. Obviously, such surfaces may be said to be level whether the cover sections are square or circular in cross-section.

While it is preferred to provide rolling or movable seals according to the present invention, it will be appreciated that the rolling or movable seals may be dispensed with in various installations, particularly where suitable means are provided for exerting sufficient force on the movable cover section to overcome the frictional engagement therewith of a stationarily disposed seal. For example, as is shown in Figure 11, a seal 44b may be fixedly associated with the stationary portions of the cover and the movable cover section 26b may be adapted for movement with respect to the seal and the stationary cover portions. As is also shown in Figure 11, it is not necessary that the stationary covers sections 24 be passed through the interior of the bus rings 22. As is shown in Figure 11, the cover sections 24 may be suitably passed over the outside surface of the flange portion 21 of the bus rings 22b at one side of the ring and may be suitably secured thereto as by welding, bolting or the like. In addition, the seal need not be effected between a cover section 24 and the movable cover section 26. As shown in Figure 11, the other flange portion 23 of the bus ring 22b may be provided with a suitable peripheral groove therein adapted for the reception of the seal 44b and the movable cover section 26b may be telescopically associated or engaged with the flange of the ring and the seal carried thereby.

In the embodiment of the invention shown in Figure 11, the right hand end of the movable cover section 26b may be suitably provided with sealing means as shown in either of Figures 5 to 7, or Figures 8 to 10, or may be suitably provided with sealing means similar to those shown in Figure 11, as desired.

From the foregoing, it will be appreciated that the present invention provides bus enclosures including stationary cover sections having spaced openings therein, movable cover sections for closing the openings in the stationary cover sections and gasket means for conveniently, efficiently and rapidly effecting a seal between the movable cover sections and the stationary cover sections. By telescopically mounting the movable cover sections on the stationary cover sections, the movable cover sections are accurately guided for movement with respect to the stationary cover sections and the gasket or sealing means. Accordingly, the present invention provides bus enclosures adapted to be readily and conveniently opened to provide for access to the interior of the bus and for inspection and cleaning of the bus bars and their supports.

While we have described what we regard to be preferred embodiments of our invention, it will be apparent that various changes, rearrangements and modifications may be made therein without departing from the scope of the invention, as defined by the appended claim.

We claim:

A bus enclosure comprising a pair of axially aligned stationary enclosure sections, said stationary sections being substantially spaced apart at the adjacent ends thereof to accommodate periodic inspection and repair of a bus supported within said sections, a movable enclosure section of a size larger than said stationary sections and of a length greater than the space between said stationary sections telescopically mounted on one of said stationary sections, said movable section normally bridging the space between and telescoping over said adjacent ends of said stationary sections to enclose the bus, said one stationary section being of a length at least as great as said movable section to accommodate complete telescoping of said movable section onto said one stationary section, said stationary sections adjacent said ends thereof having unobstructed external surface portions of predetermined length, said movable section adjacent the opposite ends thereof having unobstructed internal surface portions of predetermined length, a first O-ring seal rollably and sealably mounted on said external surface portion of said other stationary section, and a second O-ring seal rollably and sealably mounted on said external surface portion of said one stationary section, said seals rollably and sealably engaging the respective internal surface portions of said movable section in the normal closed position of said movable section, said surface portion of said one stationary section being located adjacent said end thereof and being depressed inwardly of the sections, said surface portion at the end of said movable section normally telescoping over said one stationary section being correspondingly depressed and of a size larger than said one stationary section, the remainder of said movable section being of a size larger than said second seal, said surface portion at the opposite end of said movable section extending freely to said opposite end of said movable section, said movable section being moved to open the space between said stationary sections by movement of said movable section in the direction of said one stationary section to roll and to roll over said seals until the trailing end of said movable section clears said first seal and said depressed portion of said movable section clears said second seal whereupon said movable section is relieved from frictional engagement with both of said seals and is freely telescoped onto said one stationary section independently of said seals, said movable section being moved to close the space between said stationary sections by movement in the reverse direction, said movable section being moved substantially to its normal closed position independently of said seals, said movable section as it approaches its closed position frictionally re-engaging at its leading end said first seal and at its depressed portion said second seal to roll said seals under the leading end and depressed end portion respectively of said movable section, whereby said seals are sealingly confined between said movable section and the respective stationary sections sealingly to enclose the bus.

References Cited in the file of this patent

UNITED STATES PATENTS

| | | |
|---|---|---|
| 1,943,496 | Thompson | Jan. 16, 1934 |
| 2,272,115 | Halkyard | Feb. 3, 1942 |
| 2,313,972 | Rugg | Mar. 16, 1943 |
| 2,321,415 | Peltz | June 8, 1943 |
| 2,421,480 | Burge | June 3, 1947 |
| 2,516,743 | Allin | July 25, 1950 |
| 2,531,017 | West | Nov. 21, 1950 |
| 2,532,773 | Kellam | Dec. 5, 1950 |

FOREIGN PATENTS

| | | |
|---|---|---|
| 257,100 | Great Britain | Aug. 28, 1926 |
| 357,535 | France | Nov. 14, 1905 |
| 703,105 | France | Feb. 2, 1931 |